US005231886A

United States Patent [19]

Quirk et al.

[11] Patent Number: 5,231,886

[45] Date of Patent: Aug. 3, 1993

[54] NON-METALLIC GEAR SHAKER

[75] Inventors: Michael J. Quirk; Timothy E. Drake, both of Westfield, N.Y.; John E. Zarycki, North East, Pa.

[73] Assignee: Renold, Inc., Westfield, N.Y.

[21] Appl. No.: 752,947

[22] Filed: Aug. 29, 1991

[51] Int. Cl.[5] .......................... F16H 33/00; F16P 1/00

[52] U.S. Cl. ............................................ 74/61; 74/608; 74/609; 74/DIG. 10; 198/770; 209/367; 366/128

[58] Field of Search ........... 74/61, 608, 609, DIG. 10; 198/770; 209/367; 366/128; 384/469

[56] References Cited

U.S. PATENT DOCUMENTS

| | | | |
|---|---|---|---|
| 1,999,213 | 4/1935 | Shaler | 74/61 X |
| 2,016,006 | 10/1935 | Hall et al. | 366/128 X |
| 2,144,382 | 1/1939 | Lincoln et al. | 74/61 |
| 2,501,158 | 3/1950 | Chilcott | 366/128 X |
| 2,771,179 | 11/1956 | Musschoot | 209/367 X |
| 2,839,943 | 6/1958 | Caldwell et al. | 74/DIG. 10 X |
| 2,875,988 | 3/1959 | Wysong | 74/61 X |
| 2,897,734 | 8/1959 | Bodine, Jr. | 74/61 X |
| 3,089,582 | 5/1963 | Musschoot et al. | 209/367 |
| 3,173,300 | 3/1965 | Loveless | 74/61 |
| 3,212,345 | 10/1965 | Rechenberg et al. | 209/367 X |
| 3,417,966 | 12/1968 | Bodine | 74/61 X |
| 3,630,357 | 12/1971 | Nolte | 74/61 X |
| 3,640,508 | 2/1972 | Reibig | 74/87 X |
| 4,218,929 | 8/1980 | Spurlin | 198/770 X |
| 4,424,718 | 1/1984 | Wadensten | 366/128 X |
| 4,463,831 | 8/1984 | Wakase | 74/DIG. 10 X |
| 4,590,814 | 5/1986 | Wadensten | 366/128 X |
| 4,784,088 | 11/1988 | Tamba et al. | 74/DIG. 10 X |
| 4,793,196 | 12/1988 | Davis et al. | 74/61 |
| 4,911,834 | 3/1990 | Murphy | 209/367 X |
| 4,942,776 | 7/1990 | Quirk et al. | 74/61 |
| 5,010,778 | 4/1991 | Riedl | 74/61 |

FOREIGN PATENT DOCUMENTS

| | | | |
|---|---|---|---|
| 0646915 | 11/1950 | United Kingdom | 209/367 |

*Primary Examiner*—Leslie A. Braun
*Assistant Examiner*—David E. Henn
*Attorney, Agent, or Firm*—Lovercheck and Lovercheck

[57] ABSTRACT

A shaker with an open frame, sides, a flat bottom and open ends. The shaker has pre-lubricated sealed bearings and a self-lubricating plastic gear with a metal gear, which not only educes the amount of friction between gear teeth, reduces maintenance and noise resulting from the gears and enables applicant to provide an integral open frame in which the gears are supported. The gears may be inserted into the frame through the openings in the frame. This provides for easy assembly and the absence of lubricant is especially important in the food industry and other industries where contamination of products would be objectionable.

13 Claims, 2 Drawing Sheets

NON-METALLIC GEAR SHAKER

BACKGROUND OF THE INVENTION

Applicant is aware of the following related U.S. Pat. Nos. 4,042,196 to Quirk et al; 1,517,587 to Roth; 1,999,213 to Shaler; 2,144,382 to Lincoln et al; 2,839,943 to Caldwell et al; 2,897,734 to Bodine, Jr.; 3,417,966 to Bodine; 3,630,357 to Nolte; 3,640,508 to Reibig; 4,784,088 to Tamba et al and 4,793,196 to Davis et al.

Shakers or vibrators have been known for many years, however, such shakers have various limitations and disadvantages. Various types of counter rotating shakers have been suggested throughout the years, however most of these shakers require substantial maintenance and have reliability problems. Noise of the gears in rotary shakers is also a significant problem. Lubrication of gears and bearings is another problem especially due to contamination of the product by oil when used in the food or drug industry.

SUMMARY OF INVENTION

The present invention uses pre-lubricated sealed bearings, self lubricating gears eliminating the need for a sealed housing and making it possible to use an open frame. Eccentric weights are supported on the shafts for generating linear vibratory motion. The open frame of the present invention makes it possible to assembly the gears through the open ends of the frame, to assemble the shafts through bores in the frame and by inserting the bearings into bores in the sides of the frame. The open frame has a further benefit of reducing weight and saving material.

It is an object of the invention to provide a gear coupled counterrotating vibrator with an open frame, self-lubricating plastic gears, and sealed pre-lubricated bearings wherein noise of the gears is significantly reduced and wear, maintenance and assembly problems are likewise reduced.

Another object of the invention is to provide a shaker with an open frame which provides a convenient access to the gears for assembly, inspection and service.

Another object of the invention is to provide a shaker that is simple in construction economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DESCRIPTION OF THE PREFERRED EMBODIMENT(S)

Figure 1:
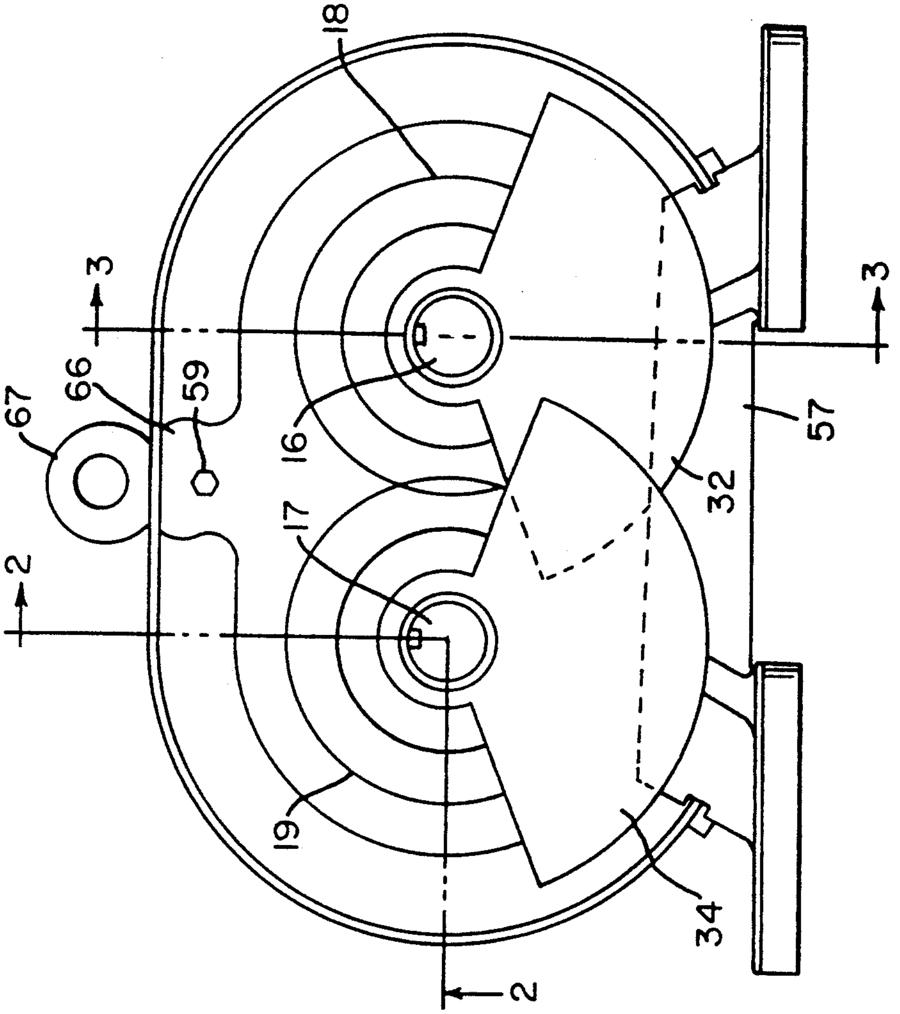
FIG. 1 is a side view of the shaker with one side of the cover removed, according to the invention.
Figure 2:
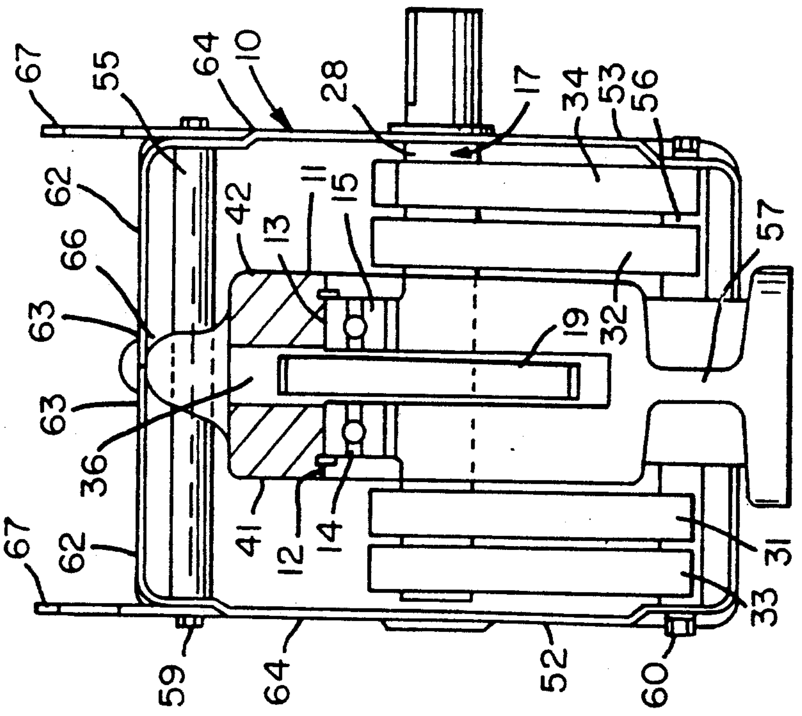
FIG. 2 is a cross sectional view taken on line 2—2 of FIG. 1 with an end of each cover removed.
Figure 3:
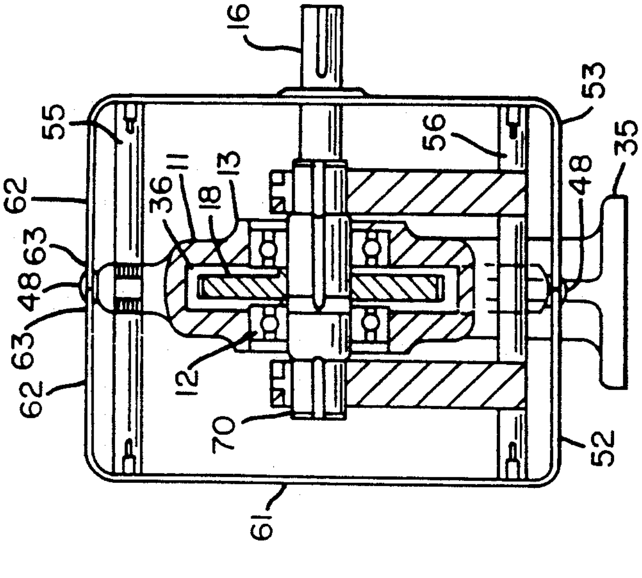
FIG. 3 is a cross sectional view taken on line 3—3 of FIG. 1.
Figure 4:
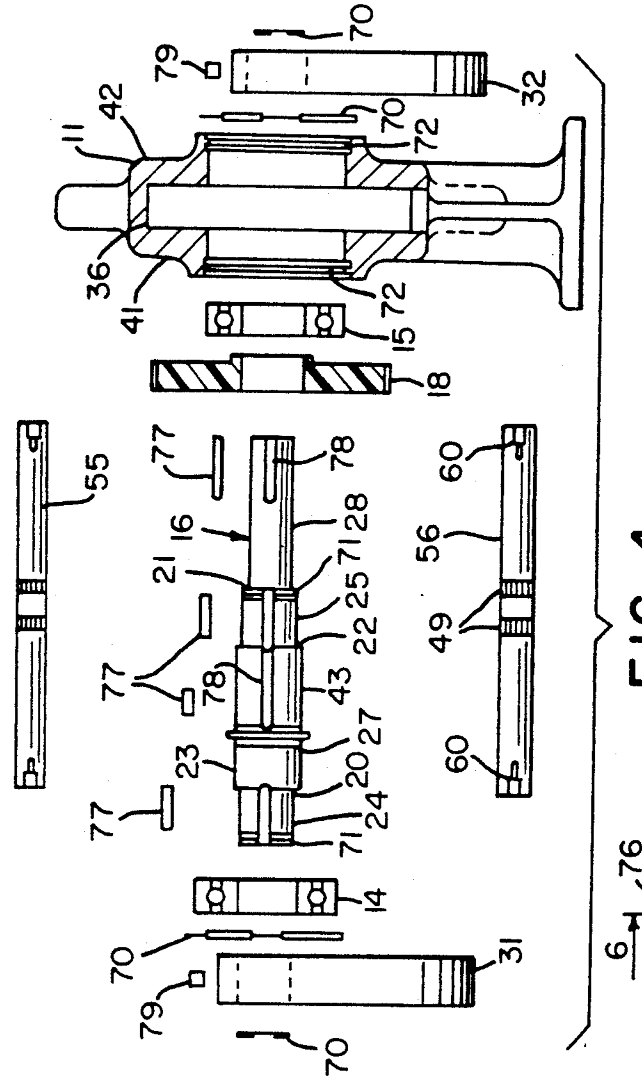
FIG. 4 is an exploded view of the shaker according to the invention.
Figure 5:
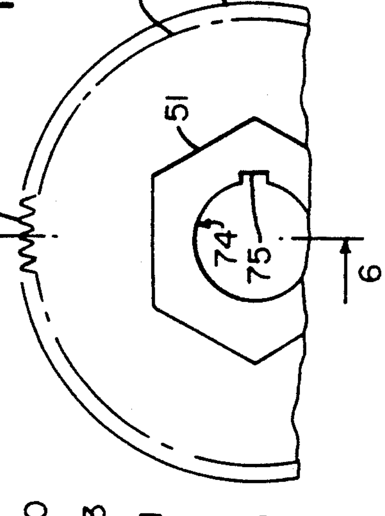
FIG. 5 is a side view of one of the gears used in the shaker.
Figure 6:
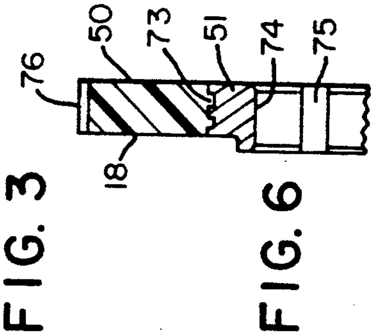
FIG. 6 is a cross-sectional view taken on line 6—6 of FIG. 5.

Now with more particular reference to the drawings, a gear coupled counter rotating shaker is shown having cover 10 and frame 11.

Cover 10 is made up of cover parts 52 and 53 which are detachably supported on frame 11 by spacers 55 and 56. Cover parts 52 and 53 fully cover eccentric weights 31, 32, 33 and 34. Studs 59 and 60 hold cover parts 52 and 53 and lifting lugs 67 to spacers 55 and 56. Spacers 55 and 56 have knurled parts 49 that help hold spacers 55 and 56 in position when pressed into frame 11. Cover parts 52 and 53 each have a flat bottom 64 and sides 62 which terminate in rim 63. Rim 63 is received in seal strip 48 which may be made of a flexible plastic material that is H-shaped in cross section.

Frame 11 has first side part 41 and second side part 42 integrally connected together by cover support lug 66, and base 35 with elongated space 36 therebetween. First side part 41 and second side part 42 have bearing receiving bores 12 and 13. The top and ends of elongated space 36 are open, except for cover support lug 66. Base 35 has web 57.

Drive shaft 16 and driven shaft 17 are substantially identical except that reduced size end part 28 on drive shaft 16 is longer than reduced size end part 28 on driven shaft 17. Reduced size end part 28 on drive shaft 16 extends through cover part 53 and may be connected to a drive means. Both drive shaft 16 and driven shaft 17 have an enlarged central part 43 joining bearing support parts 23 and 25 at shoulders 22 and 27. Reduced size end parts 24 and 28 join bearing support parts 23 and 25 at shoulder 20 and 21 respectively. Bearing support parts 23 and 25 receive pre-lubricated bearings 14 and 15 respectively. Grooves 72 in side parts 41 and part 42 receive retaining ring 70 and hold pre-lubricated bearings 14 and 15 against shoulders 22 and 27 of drive shaft 16 and driven shaft 17. Drive shaft 16 and driven shaft 17 both have grooves 71 that receive retaining rings 70 which retain eccentric weights 31, 32, 33 and 34 in place.

Electric weights 31, 32, 33 and 34, drive gear 18 and driven gear 19 are keyed to drive shaft 16 and to driven shaft 17 by keys 77 in keyways 78 and locked in place by set screws 79. Metal hub part 51 of drive gear 18 and/or driven gear 19 may be hexagonal or any other suitable non-circular shape. Metal hub part 51 may extend out axially beyond plastic tooth part 50. Grooves 73 in the outer periphery of metal hub part 51 provide a better bonding area for the plastic tooth part 50 to the metal hub part 51. Teeth 76 are cut as a last operation of manufacturing of the plastic tooth part 50, thereby insuring teeth 76 will be as perfectly concentric to hub opening 74 as possible. Keyway 75 of hub opening 74 engages key 77 of enlarged central part 43 so that the hub rotates with its respective shaft.

METHOD OF ASSEMBLY

The shaker may be assembled by inserting retaining rings 70 into grooves 72 in a side part 41 of frame 11; inserting pre-lubricated bearing 14 into bearing receiving bore 12 and inserting drive gear 18 and driven gear 19 into elongated space 36 between first side part 41 and second side part 42 of frame 11; inserting drive shaft 16 through bearing receiving bore 13 in side part 42, through drive gear 18 and into pre-lubricated bearing 14 which has previously been installed in second side part 41. Insert driven shaft 17 through bearing receiving bore 13, through driven gear 19 and into pre-lubricated bearing; install pre-lubricated bearing 15 over reduced size end part 28 of drive shaft 16 and of driven shaft 17 in second side part 42; install two retainer rings 70 in grooves 72 in second side part 42 against pre-lubricated bearing 15. Install eccentric weights 31 and 32 on drive shaft 16 and install eccentric weights 33 and 34 onto driven shaft 17. Press spacer 55 into bore in cover support lug 66. Press spacer 56 into a bore in web 57 of base 35. The shaker is then completely assembled and ready to be used. Install cover parts 52 and 53 on spacers 55 and 56. The above sequence of steps in the method of assembly is given as an example only and the specific order of the steps of the method described above may be changed to accommodate the convenience of the particular situation encountered.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A gear coupled, counterrotating vibratory shaker comprising:

an open frame for operatively connecting to a device to be vibrated in a desired linear motion, said open frame having a first side and a second side integrally connected together and defining an elongated central space therein, a drive shaft extending through said space and rotatably supported by sealed pre-lubricated first bearings supported in first openings in said sides for rotation about a drive shaft axis, said drive shaft having a central section and end sections, a drive gear mounted on said central section for rotation with the drive shaft within said space, a driven shaft extending through said space and rotatably supported by second sealed pre-lubricated bearings in second openings in said sides, said driven shaft having a central gear section and end sections, a driven gear mounted on said central gear section of said driven shaft and intermeshed with the drive gear for rotating said driven shaft at the same angular speed but in a direction counter to said drive shaft, eccentric weights mounted on said end sections of both the drive shaft and the driven shaft for rotation therewith in counterrotating directions in phased angular relationship to generate vibrational linear motion, at least one of said gears having a metal hub and a plastic gear ring mounted on said metal hub, said plastic gear ring has plastic teeth engaging the teeth of the other gear, a cover detachably mounted to said open frame to fully encircle said eccentric weights, said cover being made of a first half and a second half, a spacer extending through said first half of said cover, through said open frame and fixed to said open frame, through said second half of said cover and fastening means on said spacer adapted to secure said cover to said spacer.

2. A gear-coupled counter rotating vibratory shaker comprising;

a frame adapted to be operatively connected to a device to be vibrated;

said frame having side parts spaced from one another and integrally connected together by a base and defining an elongated channel-like space having open ends;

a drive gear and a driven gear meshing with each other and disposed in said space;

a drive shaft extending through said driven gear and through sealed pre-lubricated bearings supported on said side parts;

a driven shaft extending through said driven gear, and through pre-lubricated sealed bearings supported on said side parts;

one of said drive gear and said driven gear having a tooth section made of self-lubricating plastic material;

eccentric weights outside of said frame and mounted on said drive shaft;

and eccentric weights outside of said frame and mounted on said driven shaft.

3. The shaker recited in claim 2 wherein said side parts of said frame have a base integrally attached to said side parts and extending therebetween.

4. The shaker recited in claim 2 wherein said frame has a cover support lug integrally attached to said side parts and extending across the top of said space between said side parts for supporting a cover.

5. The shaker recited in claim 2 wherein said shaker has a cover comprising a first cover part and a second cover part;

said first cover part and said second cover part each being cup-like in shape and having a flat bottom and sides extending from said flat bottom and terminating in a rim;

said first cover part and said second cover part receiving said eccentric weights;

and support means supporting said cover on said frame.

6. The shaker recited in claim 2 wherein said support means comprises spacer means supported on said frame;

sealing means disposed between said rim of said first cover part and said rim of said second cover part thereby forming a closure to exclude dust and other contamination from said drive gear and said driven gear.

7. The shaker recited in claim 2 wherein said drive shaft and said driven shaft each have an enlarged central part, two spaced bearing support parts and two spaced reduced size end parts;

said enlarged central part being disposed between said bearing support parts and joining said bearing support part at first shoulders;

said bearing support parts being disposed between said reduced size end parts and joining said reduced size end parts at second shoulders;

said drive gear and said driven gear being fixed to said enlarged central parts of said drive shaft and said driven gear and being supported on said enlarged part of said driven shaft;

said eccentric weights being supported on said reduced size end parts.

8. A method of assembling a shaker comprising: providing a frame having an open end, a first side part and a second side part spaced from one another and defining a space;

said first side part and said second side part each having shaft receiving openings spaced from one another, four eccentric weights a drive shaft, a driven shaft, a drive gear and a driven gear;

one of said gears having teeth made of self-lubricating material;

said method further comprising the steps of inserting said drive gear and said driven gear into said space;

inserting said shafts through said shaft receiving openings in said first side part, through said gears, and through said opening in said second side part;

placing two said eccentric weights on said drive shaft, one on each side of said frame receiving said eccentric weights to said drive shaft and securing said two eccentric weights to said drive shaft; and, placing two said eccentric weights on said driven shaft, one said eccentric weight on each said side of said frame and securing said two weights to said driven shaft.

9. The method of claim 8 further including securing said drive gear to said drive shaft and securing said driven gear to said driven shaft.

10. The method of claim 9 further including placing said shafts through said pre-lubricated bearings.

11. The method of claim 10 wherein said self-lubricating material is nylon.

12. The method of claim 8 further providing pressing spacers through said frame and supporting a cover on said spacers.

13. The method of claim 8 further providing, comprising said cover bearing made up of two cup-shaped cover parts and supporting said cover parts on said spacers.

* * * * *